United States Patent
Schell et al.

(10) Patent No.: US 11,689,408 B2
(45) Date of Patent: *Jun. 27, 2023

(54) DYNAMIC TRIGGER COMPENSATION IN OFDM SYSTEMS

(71) Applicant: Sirius XM Radio Inc., New York, NY (US)

(72) Inventors: Edward Schell, Jackson, NJ (US); Carl Scarpa, Plainsboro, NJ (US)

(73) Assignee: Sirius XM Radio Inc., New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 17/217,362

(22) Filed: Mar. 30, 2021

(65) Prior Publication Data

US 2022/0078064 A1    Mar. 10, 2022

Related U.S. Application Data

(63) Continuation of application No. 16/655,822, filed on Oct. 17, 2019, now Pat. No. 10,999,116.

(51) Int. Cl.
*H04L 27/26* (2006.01)
*H04L 25/02* (2006.01)
*H04L 25/06* (2006.01)

(52) U.S. Cl.
CPC ...... *H04L 27/2646* (2013.01); *H04L 25/0204* (2013.01); *H04L 25/061* (2013.01); *H04L 27/265* (2013.01); *H04L 27/2695* (2013.01)

(58) Field of Classification Search
None
See application file for complete search history.

(56) References Cited

U.S. PATENT DOCUMENTS

| | | | | |
|---|---|---|---|---|
| 10,667,148 B1* | 5/2020 | Rakib | ................... | H04L 25/022 |
| 2008/0165674 A1* | 7/2008 | Lee | ..................... | H04L 27/2675 |
| | | | | 370/210 |
| 2012/0219041 A1* | 8/2012 | Lindoff | ............. | H04L 25/03343 |
| | | | | 375/219 |
| 2015/0172089 A1* | 6/2015 | Chae | ................... | H04L 27/2672 |
| | | | | 375/295 |
| 2019/0296832 A1* | 9/2019 | Abughalieh | ....... | H04B 10/6162 |

* cited by examiner

*Primary Examiner* — Otis L Thompson, Jr.
(74) *Attorney, Agent, or Firm* — Kramer Levin Naftalis & Frankel LLP (57) ABSTRACT

Systems and methods for enabling pre-compensation of timing offsets in OFDM receivers without invalidating channel estimates are described. Timing offset estimations may be sent along with the received OFDM symbols for FFT computation and generating a de-rotated signal output. The timing offset estimation may provide a reference point for dynamic tracking of timing for an OFDM signal and estimated based on an integral value associated with the OFDM signal.

10 Claims, 11 Drawing Sheets

Amplitude with no Sample Offset

FIG. 4

Phase with no Sample Offset

FIG. 5

Amplitude wih an Offset Duration of 1 Sample

FIG. 6

Phase with an Offset Duration of 1 Sample

FIG. 7

Amplitude wih an Offset Duration of 5 Samples

FIG. 8

Phase with an Offset Duration of 5 Samples

DYNAMIC TRIGGER COMPENSATION IN OFDM SYSTEMS

CROSS-REFERENCE TO RELATED APPLICATIONS

This application is a continuation of U.S. patent application Ser. No. 16/655,822, filed on Oct. 17, 2019, which issues as U.S. Pat. No. 10,965,513 on Mar. 30, 2021 the content of which is incorporated herein by reference.

TECHNICAL FIELD

The present subject matter relates to signal modulation and demodulation techniques, including, techniques for compensating for channel effects in Orthogonal Frequency Division Multiplexing (OFDM) signals.

BACKGROUND

Orthogonal Frequency Division Multiplexing (OFDM) is a modulation technique employing a multi-carrier transmission system, wherein sub-carriers employing Frequency Division Multiplexing (FDM) may overlap in the frequency domain but remain orthogonal in phase to each other. OFDM increases bandwidth and channel efficiencies by allowing multiple channels to be packed together closely in the frequency domain. An increase in a number of the sub-carriers increases the bandwidth of OFDM systems. OFDM may be widely used when frequency selective channels are of concern. Effects of the main channel on transmission accuracies may translate into phase and amplitude distortions of the signal samples in the frequency domain.

In general, two types of detection schemes may be designed for OFDM systems: coherent and non-coherent. Coherent-based detection schemes generally rely on determining an accurate channel estimate to equalize and undo the effects of the channel, which is typically done with pilot symbols at the expense of system throughput. Non-coherent systems, such as Differential Phase Shift Keying (D-PSK), do not require the use of pilot symbols for a channel estimate, but may suffer a performance loss in signal-to-noise ratio (SNR). To achieve higher data rates, coherent-based detection schemes with higher order constellations (e.g., higher order modulation formats such as Quadrature Phase Shift Keying (QPSK) and m-ary Quadrature Amplitude Modulation (m-QAM)) have become widely used in recent applications.

With varying timing offsets, a method is needed to compensate for the effects of the offset prior to channel estimation.

SUMMARY

The present subject matter provides a technique to allow for dynamic timing compensation in an OFDM receiver. In some embodiments, the present subject matter can be implemented in a coherent detection scheme that tends to require consistency in the phase of the signal time averaging of the channel estimate and/or may require consistency in the phase of the signal. The present subject matter can also be applied, in some embodiments, to systems with a non-coherent detection scheme, such as Differential Quadrature Phase Shift Keying (DQPSK). DQPSK may generally be immune to phase changes from frame to frame, but may need to compensate for the common phase error across the transmission band. When applied to DQPSK, the present subject matter can minimize an amount of common phase error observed in the received samples and/or frames.

In some embodiments, the system described herein may receive a frequency modulated signal, determine a timing reference point associated with the frequency modulated signal, and estimate a value for timing offset based on the timing reference point. The receiver of the frequency modulated signal may generate a demodulated signal based on applying a compliment of the timing offset to a set of samples of the frequency modulated signal after conversion into the frequency domain. The set of samples to which the compliment of the timing offset may be applied, can be selected from the received signal based on an additional parameter related to dynamic timing determination. Values of the timing offset may additional depend on the dynamic timing. By estimating timing offset values prior to conversion of the frequency modulated signal into the frequency domain, the receiver may correct for potential phase errors by using the timing offset values in generating the demodulated signals. In some embodiments, the timing reference point may be based on correlating the frequency modulated signal with a delayed copy.

The details of one or more implementations are set forth in the accompanying drawings and the description below. Other features and advantages will be apparent from the description and drawings.

BRIEF DESCRIPTION OF THE DRAWINGS

For a more complete understanding of the present disclosure and the advantages thereof may be acquired by referring to the following description taken in consideration of the accompanying drawings in which like reference numbers indicate like features, and wherein.

DETAILED DESCRIPTION

The present subject matter provides, in some embodiments, methods and systems for pre-compensation of timing offsets in communication networks by estimating timing offset values prior to Fast Fourier Transform (FFT) processing and incorporating the estimated timing offset values in symbol information, along with the data, for FFT processing in a receiver. The timing offset information may be estimated based on a reference point associated with the data.

Figure 1:
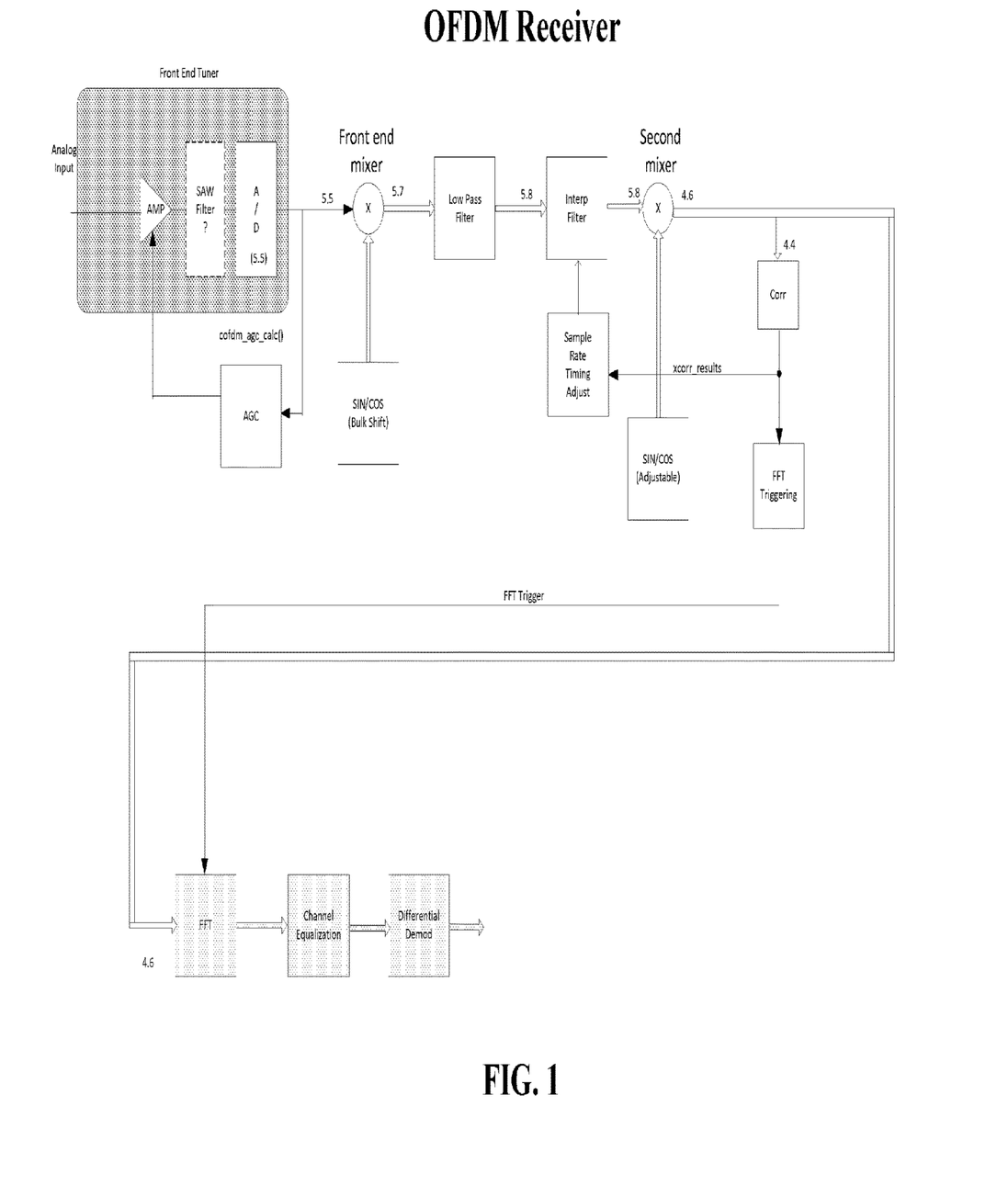
FIG. 1 shows an exemplary illustration of an OFDM receiver.

FIG. 1 shows an example illustration of an OFDM receiver. The receiver may include a front end tuner, an automatic gain control (AGC) circuit, a front end mixer, low pass filters, interpolation filters, sampling rate and timing adjustment circuits, correlator circuits, FFT triggering circuits, and circuits for performing FFT, channel equalization, and/or differential demodulation. AGC may be performed by the baseband receiver or the front end tuner, or both simultaneously. The front end mixer may apply a block frequency shift (SIN/COS bulk shift) of the signal to be centered at a desired frequency location. The interpolator may be used to achieve synchronous sampling with a predetermined FFT transmission rate. A second mixer may be used to adjust the signal to be exactly on frequency so that no inter-carrier interference is created (controlled by a carrier recovery circuit). The correlation block may be used for sampling rate control and FFT triggering control. FFT, channel equalization and differential demodulation may be performed in the frequency domain to ultimately extract the OFDM symbol data.

Figure 2:
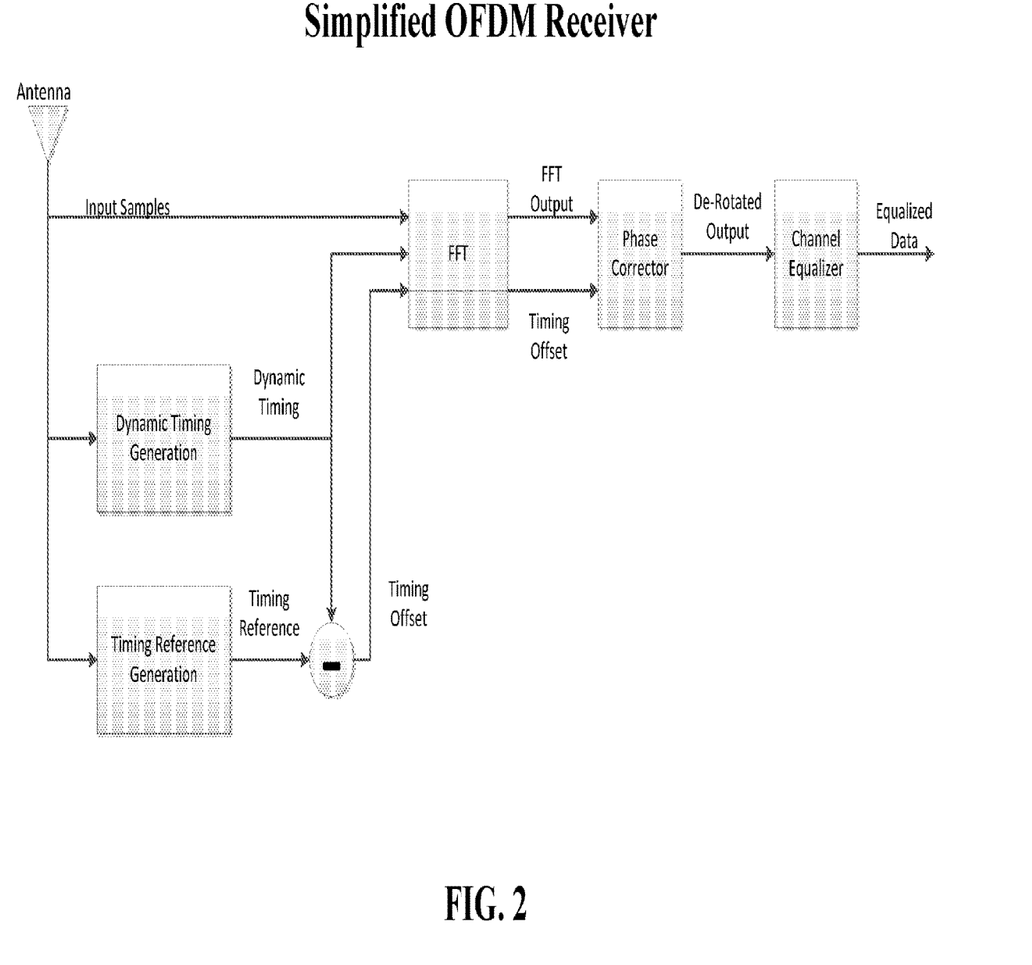
FIG. 2 shows an exemplary illustration of a simplified OFDM receiver.

FIG. 2 provides a simplified block diagram of the OFDM receiver that can compensate for timing offsets in received OFDM signals by estimating timing offset values prior to frequency domain conversion. An increase in the timing offset for the received OFDM samples may translate into an observable phase rotation in the frequency domain. This effect may be considered as a component of total channel effects that need to be compensated for in OFDM receiver stations. The receiver includes an antenna and circuits for dynamic timing generation, timing reference generation, timing offset estimation, FFT, phase correction, and channel equalization. Dynamic timing may be used for selecting the desired signal samples. In some embodiments, the OFDM receiver may estimate a timing offset prior to performing the FFT and send the estimated timing offset along with the input OFDM samples for FFT calculation. This may enable pre-compensation for the timing offset so that the FFT output is a de-rotated output with approximately no phase error. The timing offset may be estimated based on a difference between the dynamic timing value and the timing reference value. The timing offset value may be updated for each OFDM symbol. The simplified OFDM receiver may perform an FFT based on the timing offset, dynamic timing and input signal samples received from the antenna. The phase corrector circuit may then use the FFT output and the timing offset value to correct for any phase rotation and generate a de-rotated output. Implementation of the phase correction can be accomplished in a variety of ways, such as CORDIC functions and Sine Tables. The channel equalizer may be perform channel equalization and generate equalized data output. The channel equalization may include updating and applying a channel estimate that is based on phase corrected FFT output samples.

Figure 3:
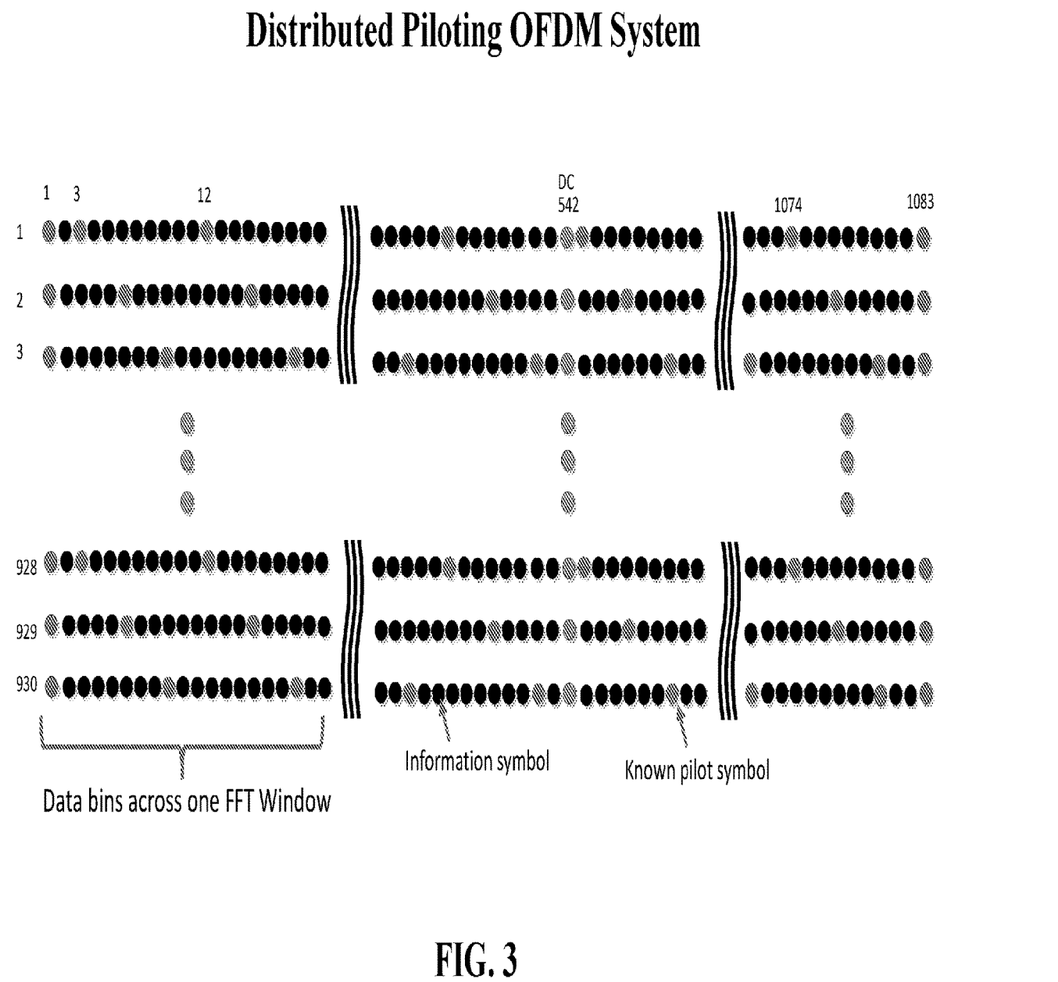
FIG. 3 shows an exemplary illustration of distributed pilots across frequency bins for an OFDM system.

FIG. 3 provides an illustrative example of a distributed pilot OFDM system that has a rotating pattern of known pilot symbol data (shown as red dots) in 1 of 9 data bins, which repeats every three FFTs resulting in a 1 of 3 pilot resolution for channel estimation when computed over the three FFTs. The black dots may correspond to information symbols. The horizontal axis may represent frequency data bins across the FFTs and the vertical axis may be representative of time. In each time slot, there are multiple known pilot symbols distributed every 9 data bins. Each time slot may shift the location of the known pilot symbols (shown by the red dots) by three data bins. Across any group of three consecutive time slots, the pilot symbols may appear to be spaced as 1 in every 3 data bins. In order to build a full channel estimate, the system may require a minimum of three consecutive OFDM symbols to achieve at least the 1 of 3 pilot symbol resolution.

Furthermore, the channel estimate may also temporally average over six additional FFTs for a more accurate result. This system may require a time coherence greater than nine OFDM symbols. Any changes to the channel conditions (or the timing offset) could corrupt and invalidate the channel estimate over several FFTs resulting in a loss performance. While the channel conditions cannot be dictated, the timing offset can be controlled, thus minimizing any effect on the channel estimate. One method of controlling the timing offset may include providing heavy integration in the techniques used to derive the timing to the OFDM symbol. Due to the integration, the timing reference does not change very quickly, and there will be no offset from one symbol to the next. However, this approach would suffer a performance loss when in a dynamic channel that is constantly changing. Good timing algorithms would attempt to respond quickly to the dynamics of the channel to get the most accurate timing estimate. In such cases, the timing offset would not be constant and must be allowed to change from one OFDM symbol to the next. When the channel is legitimately changing, the change in timing offset is inconsequential because the channel estimator must update to the new channel. However, minor fluctuations in the received signal may not reflect a significant change in the channel, but can cause a change in the timing offset. This timing offset will result in a phase rotation and can significantly compromise any current channel estimate, due to the temporal averaging used in most channel estimation techniques. The compromised channel estimate can then lead to an overall performance loss in the system when used to equalize the data path. The phase rotation in the frequency domain may be given by the following equation (1) that can translate a sample timing offset in the time domain into a phase rotation in the frequency domain via performing FFT of the sample timing offset:

$$x[(n-m)] = e^{\frac{j\omega km}{N}} * X[k], (n, k) \in N \quad (1)$$

Wherein, variable m may correspond to a number of samples that may be offset from an ideal timing associated with a total number of samples N that correspond to a size of the FFT. An offset of m samples in the time domain can result in a linear phase rotation across the FFT bins proportional to the size N of the FFT. Therefore, changes to the OFDM symbol timing may significantly compromise the current channel estimate, even though the channel may not have changed.

To minimize throughput loss, coherent systems may be designed with pilots spread in both time and frequency. This may require coherence time of the channel to be greater than time spread of the pilots across OFDM symbols such that the channel may not changing drastically from one symbol to the next. In this case, a channel estimator can be designed to temporally average channel effects over a predefined duration of time and across multiple OFDM symbols to provide a more accurate estimate of the channel effects. Changes that may occur in the channel could completely invalidate the channel estimate, and cause a performance loss until the channel estimate can catch up with the channel changes.

Due to the temporal averaging of the channel estimate over the predefined duration of time, such systems may be very sensitive to the OFDM symbol timing. OFDM symbol timing may provide information for identifying a block of N time domain samples, from a current OFDM symbol, for translation into a corresponding frequency domain signal via performing FFT.

FIGS. 4-9 illustrate this effect for a system utilizing a 100 point FFT, which may be 50% loaded with constant amplitude and/or zero phase pilots.

Figure 4:
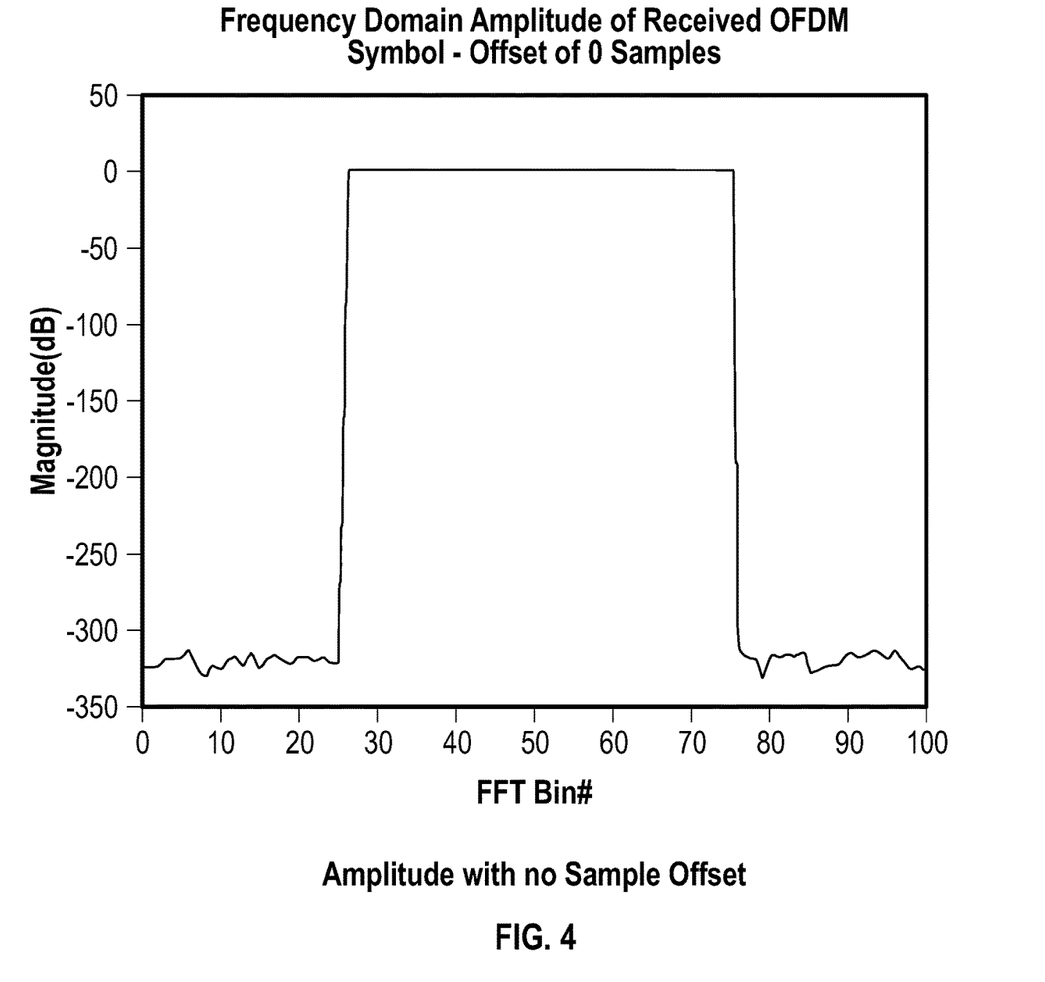
FIG. 4 shows an example of amplitude of an OFDM symbol with no sample offset in accordance with aspects of the present subject matter.
Figure 5:
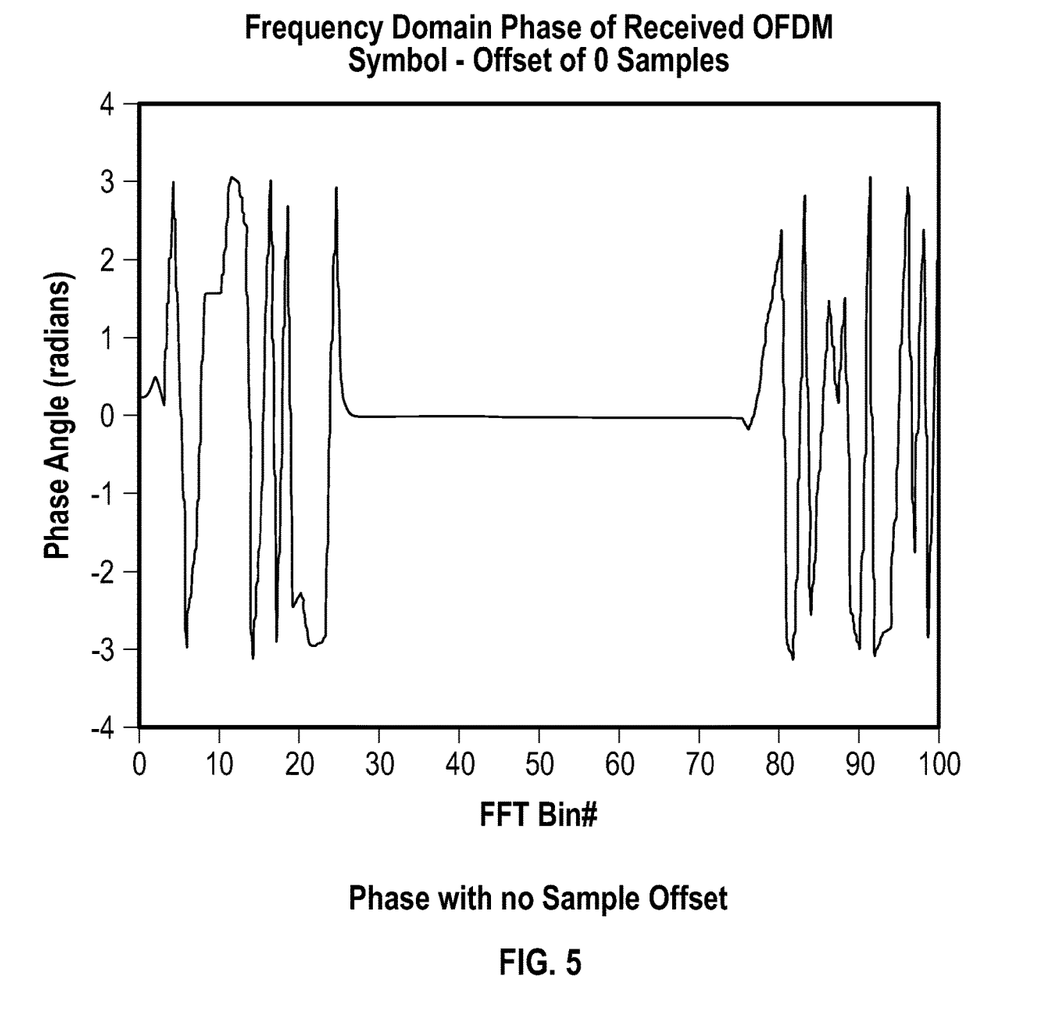
FIG. 5 shows an example of phase of an OFDM symbol with no sample offset in accordance with aspects of the present subject matter.

FIG. 4 shows amplitude of a received OFDM symbol in the frequency domain with no observable timing offset across the FFT data bins. FIG. 5 shows phase of the received OFDM symbol in the frequency domain with no observable offset across the FFT data bins. As can be seen from FIGS. 4 and 5, the OFDM symbol maintains an approximately constant amplitude and approximately zero phase offset across the FFT data bins.

Figure 6:
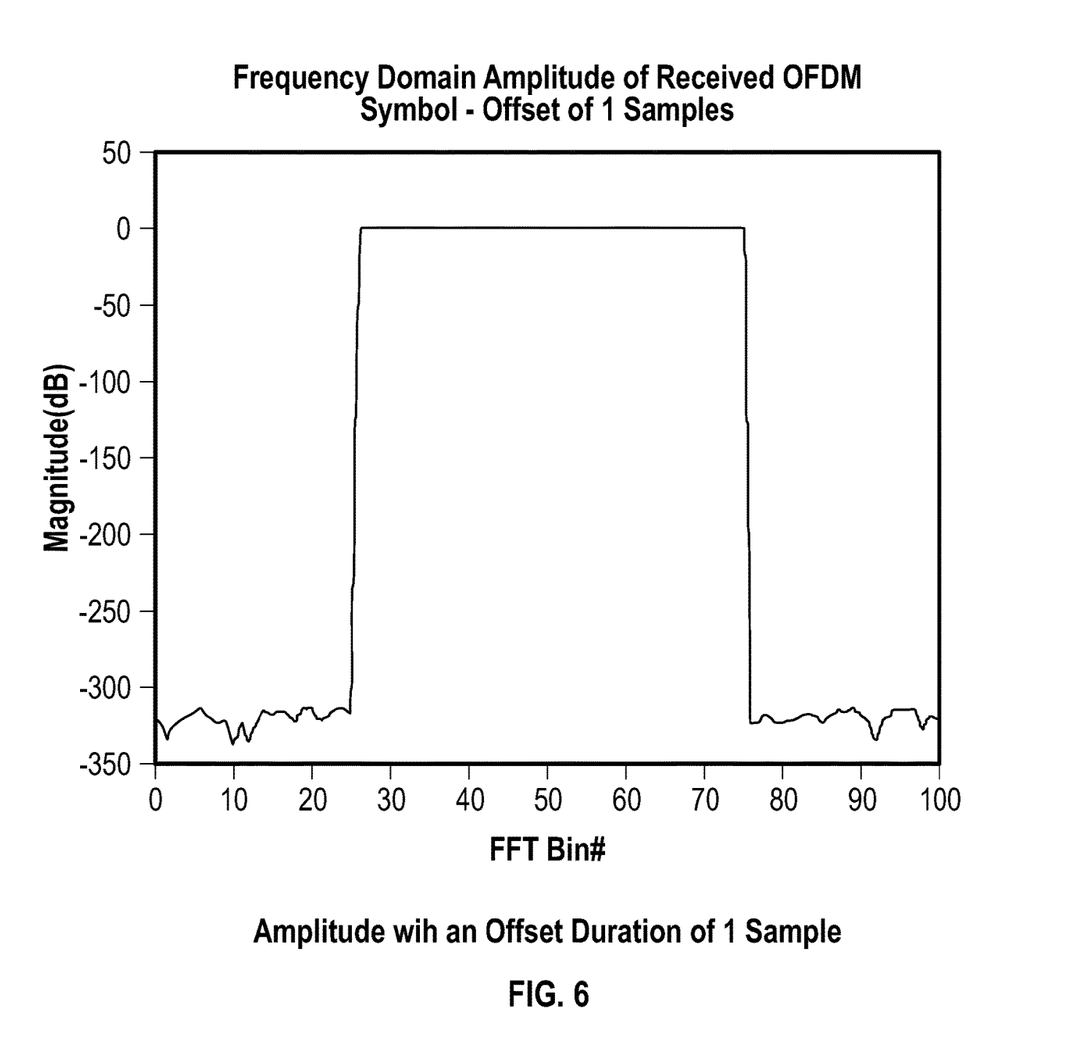
FIGS. 6 and 7 show an example of amplitude and phase respectively for an OFDM symbol with one sample offset in accordance with aspects of the present subject matter.
Figure 7:
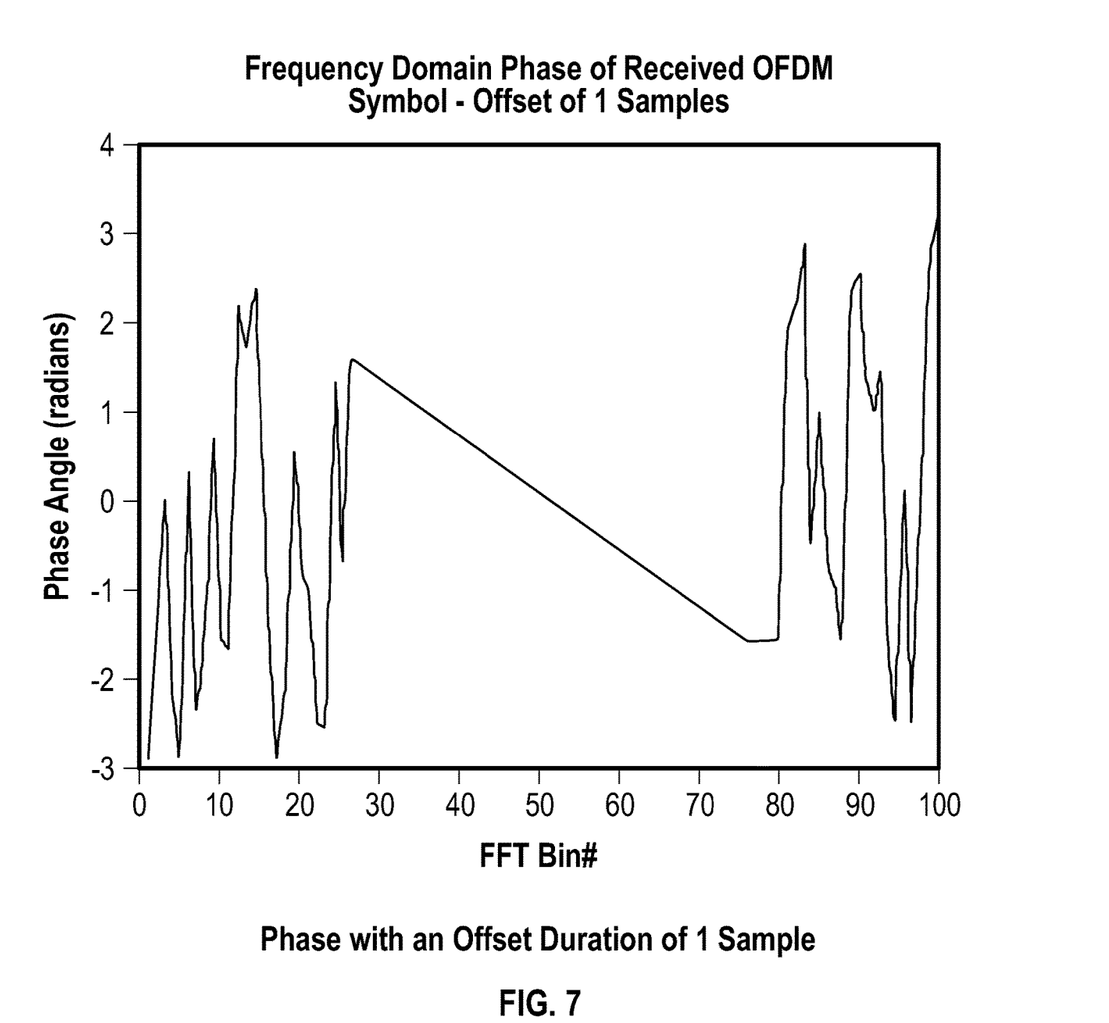

FIGS. 6 and 7 show amplitude and phase respectively for the received OFDM symbol with one sample offset across the FFT data bins. The approximate amplitude of the OFDM symbol with one sample offset, in FIG. 6, may remain nearly unaffected in comparison with the approximate amplitude of the OFDM symbol with no sample offsets. The approximate phase of the OFDM symbol with one sample offset, in FIG. 7, is seen to undergo a linear phase rotation across the FFT data bins.

Figure 8:
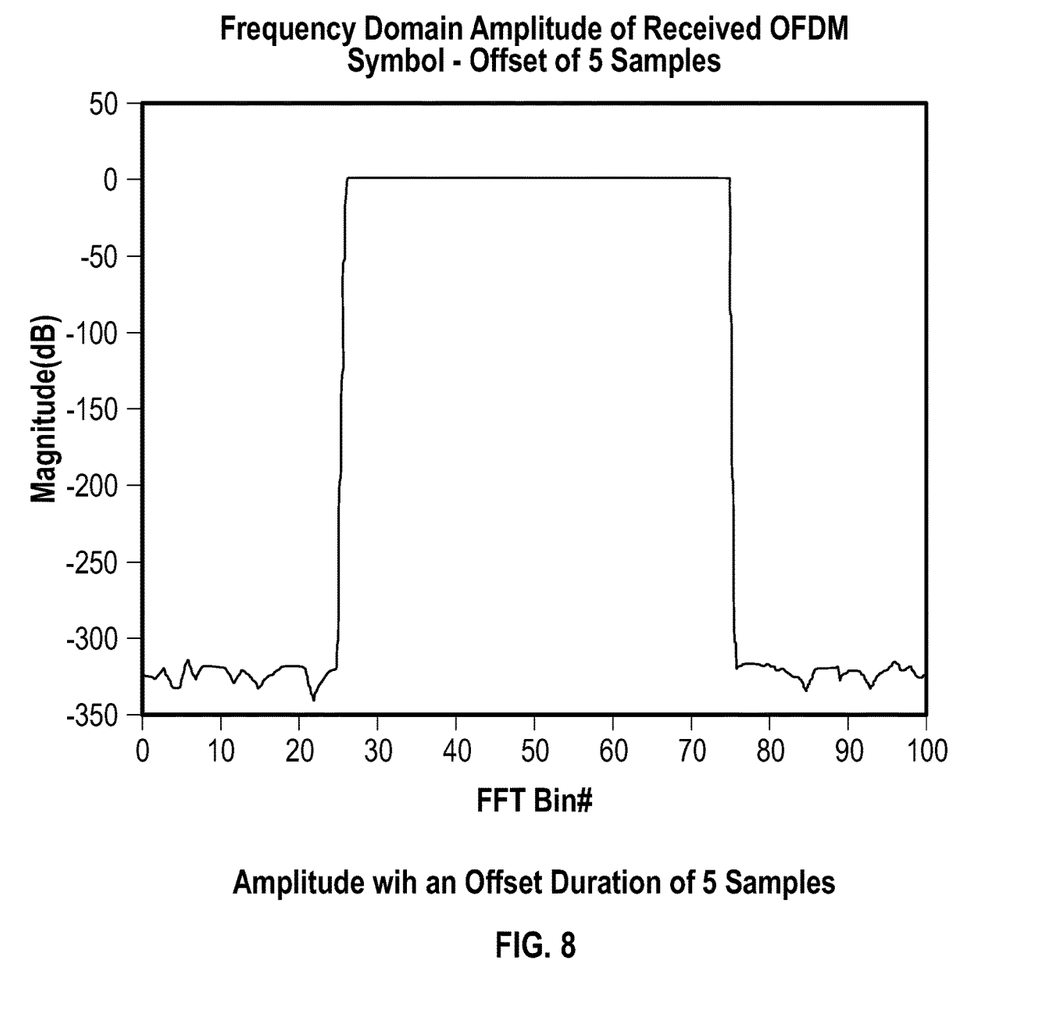
FIGS. 8 and 9 show an example of amplitude and phase respectively for an OFDM symbol with five sample offsets in accordance with aspects of the present subject matter.
Figure 9:
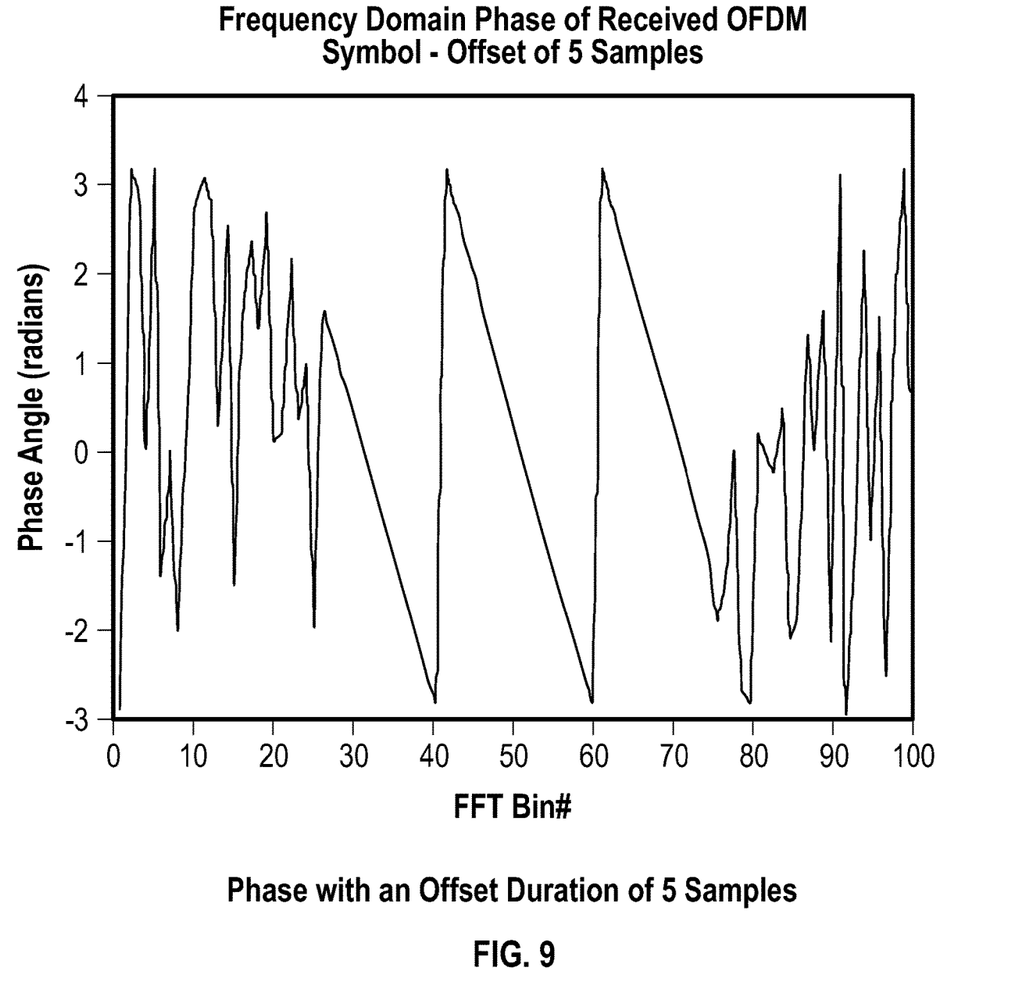

FIGS. 8 and 9 show amplitude and phase respectively for the received OFDM symbol with five sample offsets across the FFT data bins. As can be seen from FIG. 8, an approximate amplitude of the OFDM symbol remains nearly unaffected with a sample offset increase from one to five across the FFT data bins. From FIG. 9, a slope of the phase rotation, for the OFDM symbol, across the FFT data bins is seen to increase. The increase in the slope of the phase rotation, for the OFDM symbol, may be proportional to a number of samples offset.

In some embodiments, the present subject matter employs a method of obtaining OFDM symbol timing that provides for a dynamic tracking of the timing. The dynamic timing values may change on each OFDM symbol and are used to identify the block of input samples to process by the FFT. In some embodiments, an integrated value can be determined that provides a long term reference to the timing across several OFDM symbols. The timing reference value can be a function of the dynamic timing value or determined independently. Dependent on the nature of the channel being designed for, the long term reference should be integrated over enough OFDM symbols to provide a stable value among small dynamic changes, while still being able to adapt to larger static changes. For a static channel comprising good signal quality, timing values (e.g., as short as several OFDM symbols or as long as multiple seconds) associated with a long term reference in the signal may equal dynamic timing values associated with the transmitted signal, yielding zero timing offset. For a dynamic channel comprising lower signal quality, there may likely be a measureable difference between timing values associated with the reference and the dynamic timing values associated with the transmitted signal. This difference between the reference timing values and the dynamic timing values is represented as an integer number of input samples and can be considered the timing offset.

An estimation of the timing offset may provide an indication of the group of N samples that need to be processed by the FFT. A static long term reference may pick the same group of N samples each time. A dynamic timing value may shift the group of N samples in either direction as the channel changes. The result may be an offset in number of samples from one OFDM symbol to the next of which group of N samples to process by the FFT. Techniques such as Schmidl and Cox's method may be used for estimating the timing offset. For example, the method may take a start of the OFDM symbol as a maximum point of timing metric, constellation rotation, and using a reference point for calculating a difference between the reference point and dynamic timing parameters as given by equation 2 below.

Figure 10:
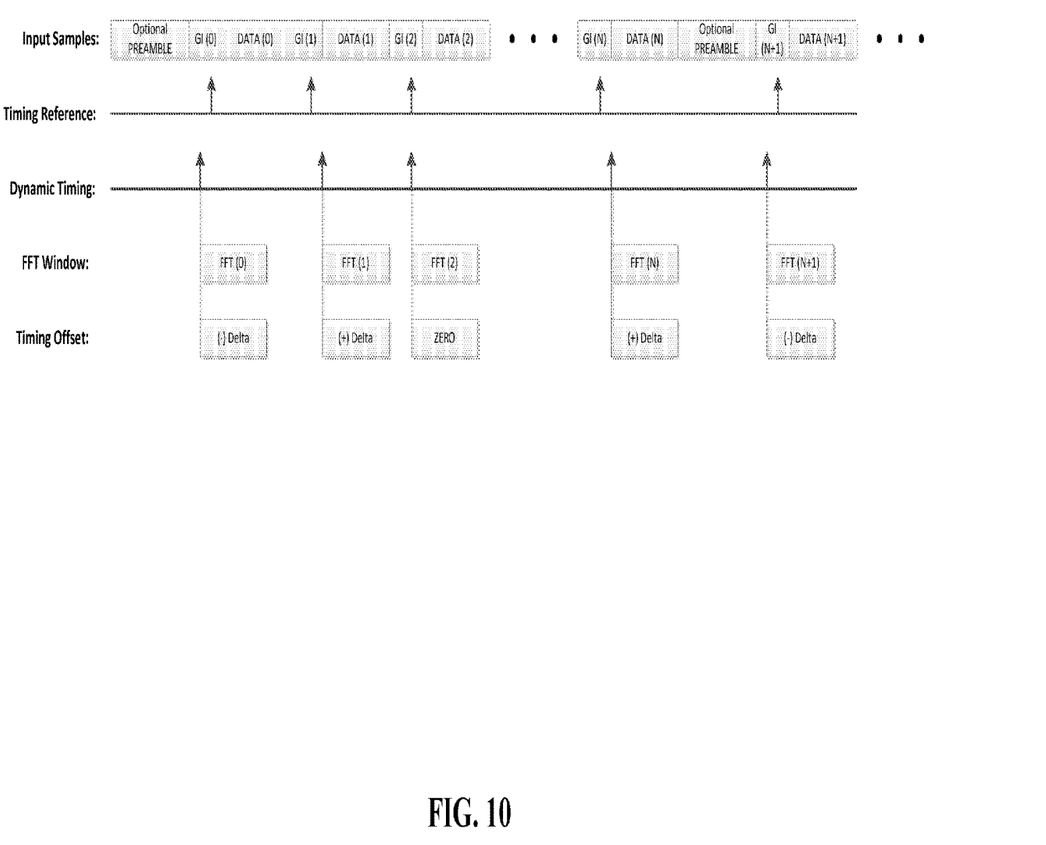
FIG. 10 shows an exemplary timing diagram in accordance with aspects of the present subject matter.

FIG. 10 provides a simplified timing diagram for generation of the timing offset and FFT window selection. The window of FFT input samples may be selected based on the location of the dynamic trigger within the guard interval (GI). The timing offset accompanying the FFT can be a (+/−) delta from the value of the dynamic timing parameter to the timing reference point, which may occur at regular intervals.

$$\text{timing\_offset} = \text{timing\_reference} - \text{timing\_dynamic} \qquad (2)$$

The timing reference point may comprise an OFDM reference symbol. The OFDM reference symbols may vary in length depending upon the technique used for timing offset estimation, such as course and fine frequency offset estimation. In some embodiments, the timing offset estimate may be carried with the OFDM symbol data into the frequency domain to pre-compensate for the timing offset at the receiver. After the FFT, the known timing offset compliment can be applied to the frequency domain samples using the properties of Equation 1 above, where m=−timing_offset which may be a positive or negative value.

Given a known timing offset (m), the FFT samples will experience the linear phase rotation as expressed in Equation 1. The complement of the timing offset (−m) may then be applied in the frequency domain using Equation 3:

Equation 3

$$\left(e^{\frac{j\omega km}{N}} * X[k]\right) * \left(e^{\frac{j\omega k(-m)}{N}}\right) = X[k], (n, k) \in N \qquad (3)$$

Consequently, the frequency domain samples may receive a linear phase correction to undo the effects of the timing offset in the FFT samples selected by the dynamic timing value. The result of this procedure will de-rotate the samples back to the timing reference point, regardless of where the dynamic triggering occurred. Therefore, the channel estimate can always see the same phase rotation due to the OFDM symbol timing.

Figure 11:
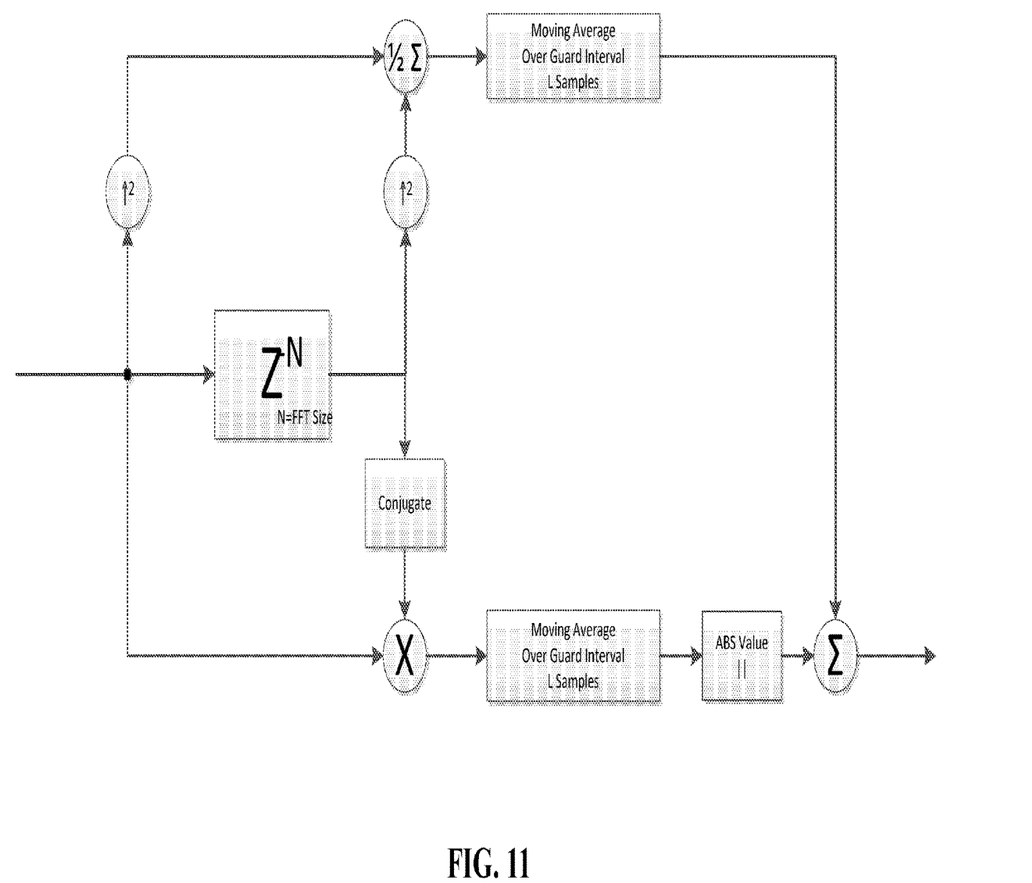
FIG. 11 shows an exemplary illustration of a correlator circuit in accordance with aspects of the present subject matter.

FIG. 11 provides an exemplary illustration of the correlator circuit. A complex input signal may be applied to a squaring circuit to estimate input signal power before delay block that introduces a delay approximately equal to a length of the FFT (e.g., N samples). A delayed copy of the complex signal may be applied to a second squaring circuit to estimate signal power after the delay block. A complex conjugate of the delayed copy of the signal may be multiplied with the un-delayed signal and normalization of the subsequent signal power may be performed by averaging (e.g., moving average over guard interval samples) the pre- and post-FFT power calculations. Averaging of the un-delayed signal copy may also be performed and both averaged signals may be integrated over a predetermined duration (e.g., guard interval) to ultimately form periodic correlation peaks. In some embodiments, a bias correction may be applied to the correlation peaks in order to overcome multi-path signal interference. Dynamic triggering values may be determined based on selecting a mid-point location between the correlation peaks. In some instances, the dynamic triggering values may be determined based on determining a location in between correlation values that satisfy a predetermined range and/or a predetermined correlation threshold.

In exemplary embodiments of the present subject matter, any suitable programming language can be used to implement the routines of particular embodiments including C, C++, Java, JavaScript, Python, Ruby, CoffeeScript, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage device or non-transitory computer readable medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nano-engineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

Particular embodiments may, as noted, be implemented in an SDARS receiver in a vehicle, in combination with UWB equipment. Other components are fixed UWB master and slave sites provided in a geographical area, where the master site has at least one of a SDARS receiver and a GPS receiver, and a slave site may have one or both of those, but need not. Such equipment may include hardware, software, middleware and firmware, as maybe appropriate.

It will also be appreciated that one or more of the elements depicted in the drawings can also be implemented in a more separated or integrated manner, or even removed or rendered as inoperable in certain cases, as is useful in accordance with a particular application. It is also within the spirit and scope to implement a program or code that can be stored in a machine-readable medium, such as a storage device, to permit a computer to perform any of the methods described above.

As used in the description herein and throughout any claims that follow, "a", "an", and "the" includes plural references unless the context clearly dictates otherwise.

Also, as used in the description herein and throughout the claims that follow, the meaning of "in" includes "in" and "on" unless the context clearly dictates otherwise.

Although various methods, systems, and techniques have been described herein, the scope of coverage of this patent is not limited thereto. To the contrary, this patent is understood to cover all methods, systems, and articles of manufacture fairly falling within the scope of the appended claims.

The invention claimed is:

1. A system for multi-carrier receiving, the system comprising:
 a receiver, wherein the receiver receives a frequency modulated signal;
 at least one processor; and
 a memory containing instructions that, when executed, cause the at least one processor to:
  determine a timing reference point associated with the frequency modulated signal;
  determine a timing offset based on the timing reference point; and
  generate a demodulated signal based on applying a compliment of the timing offset to a set of samples of the frequency modulated signal after conversion into the frequency domain.

2. The system of claim 1, wherein the set of sample of the frequency modulate signal are selected based on a dynamic timing partner.

3. The System of claim 2, wherein the timing offset is further based on the dynamic timing parameter.

4. The system of claim 3, wherein the timing offset is calculated based on a difference between a value of the dynamic timing parameter and a value of the timing reference point.

5. The system of claim 1, wherein the determining the timing reference point is based on correlating the frequency modulated signal with a delayed copy of the frequency modulated signal.

6. The system of claim 1, wherein the set of samples are converted into the frequency domain by performing a Fast Fourier Transform, and wherein the timing reference point corresponds to an orthogonal frequency division multiplexing (OFDM) symbol.

7. The system of claim 1, wherein the processor further updates a value of the timing offset for each symbol of the frequency modulated signal.

8. The system of claim 1, wherein the generating the demodulated signal further comprises correction of the phase of the set of samples after performing a Fast Fourier Transform and based on CORDIC functions.

9. The system of claim 8, wherein the correction of the phase comprises application of a linear phase correction to the set of samples that de-rotates the samples back to the timing reference point.

10. The system of claim 1, wherein the processor further performs channel equalization based on applying a channel estimate to the demodulated signal.

* * * * *